US008571581B2

(12) United States Patent
Lee et al.

(10) Patent No.: US 8,571,581 B2
(45) Date of Patent: Oct. 29, 2013

(54) METHOD AND SYSTEM FOR PROVIDING SPATIAL-BASED CONTEXT-AWARE SERVICE

(75) Inventors: Moonsoo Lee, Daejeon (KR); Min Soo Kim, Daejeon (KR); Inhak Joo, Daejeon (KR); Chung-ho Lee, Daejeon (KR); In Sung Jang, Daejeon (KR); Sung Woong Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/295,976

(22) Filed: Nov. 14, 2011

(65) Prior Publication Data

US 2012/0122476 A1    May 17, 2012

(30) Foreign Application Priority Data

Nov. 15, 2010  (KR) .......................... 10-2010-0113432

(51) Int. Cl.
*H04W 24/00* (2009.01)
(52) U.S. Cl.
USPC ...................................................... 455/456.3
(58) Field of Classification Search
USPC ............ 455/452.1, 456.1, 6.11, 67.14, 414.2, 455/574; 709/217, 203; 715/753; 707/759; 340/572.1, 572.4, 8.1
See application file for complete search history.

(56) References Cited

U.S. PATENT DOCUMENTS

| | | | |
|---|---|---|---|
| 2003/0135582 A1* | 7/2003 | Allen et al. .................... | 709/217 |
| 2007/0205888 A1* | 9/2007 | Lee et al. .................. | 340/539.18 |
| 2008/0242418 A1 | 10/2008 | Theimer et al. | |
| 2009/0061902 A1* | 3/2009 | Abhyanker ................ | 455/456.3 |
| 2011/0070898 A1* | 3/2011 | Sanjeev et al. ............. | 455/456.2 |

FOREIGN PATENT DOCUMENTS

| | | | |
|---|---|---|---|
| KR | 2007-0056673 A | 6/2007 | |
| KR | 2007-0058857 A | 6/2007 | |
| KR | 2009-0077258 A | 7/2009 | |
| KR | 2010-0084853 A | 7/2010 | |

* cited by examiner

*Primary Examiner* — Kiet Doan
(74) *Attorney, Agent, or Firm* — Rabin & Berdo, P.C.

(57) ABSTRACT

A system for providing spatial-based context-aware service includes a database configured to store a geocontext including spatial information, one or more contexts, and sensor data; a sensor/context catalog server configured to manage meta data of the contexts and the sensor data; a context processing server configured to generate a list of contexts applicable to the mobile device based on the sensor data and the meta data upon a receipt of the sensor data from the mobile device; a geocontext search server configured to search the database for candidate geocontexts appropriate for the user of the mobile device by using the location information of the mobile device and the list of contexts; and a context-aware management server configured to generate a list of recommended services by executing the searched candidate geocontexts.

15 Claims, 12 Drawing Sheets

| ID | NAME | NAME |
|---|---|---|
| 8193 | GPS_LATITUDE | DOUBLE |
| 8194 | GPS_LONGITUDE | DOUBLE |
| 12289 | ACCELEROMETET_GX | DOUBLE |
| 12290 | ACCELEROMETET_GY | DOUBLE |
| 12291 | ACCELEROMETET_GZ | DOUBLE |
| 12305 | LIGHT | DOUBLE |
| 12321 | MAGNETIC_FIELD_X | DOUBLE |
| 12322 | MAGNETIC_FIELD_Y | DOUBLE |
| 12323 | MAGNETIC_FIELD_Z | DOUBLE |

FIG.2C

| ID | NAME | SENSOR_LIST | GEOMETRY_STRING | CONSEQUENCE_STATEMENT |
|---|---|---|---|---|
| 4 | User_Attention | 12354 | [{{12354}<-120&&{12354}>-180} || {{12354}>135] | IGNORING |
| 4 | User_Attention | 12354 | {12354}>-30 | WAITING |
| 4 | User_Attention | 12354 | {12354}<-30&&{12354}>-120 | CONCENTRATING |
| 5 | Ambient_Light | 12305 | {12305}>500 | BRIGHT |

FIG.2D

| ID | NAME | CONTEXTLIST | CONDITION_STATEMENT | GEOMETRY_WKT |
|---|---|---|---|---|
| 3 | org.etri.geocontext.test.restaurant.RestaurantService | 9;8;10;11 | POLYGON[[127.367110228463.36... | 004F235964 ..... |
| 4 | org.etri.geocontext.test.news.NewsService | 9;12;13;11 | POLYGON[[127.3670266174573]... | 004F235966 ..... |
| 5 | org.etri.geocontext.test.transportation.transportationService | 6 | POLYGON[[127.3656331 0069577... | 004F235975 ..... |

```xml
<?xml version="1.0" encoding="euc-kr"?>
<result>
  <geocontext_list>
    <geocontext>
       <id>2</id>
       <poi_name>my.test.AssetService</poi_name>
       <poi_area>0.01</poi_area>
    </geocontext>
    <geocontext>
       <id>4</id>
       <poi_name>org.etri.geocontext.test.news.NewsService</poi_name>
       <poi_area>0.427184871733266</poi_area>
    </geocontext>
    <geocontext>
       <id>3</id>
       <poi_name>org.etri.geocontext.test.restaurant.RestaurantService</poi_name>
       <poi_area>0.722699406457972</poi_area>
    </geocontext>
    <geocontext>
       <id>5</id>
<poi_name>org.etri.geocontext.test.transportation.transportationService</poi_name>
       <poi_area>2.31258060263972</poi_area>
    </geocontext>
  </geocontext_list>
</result>
```

FIG.8

```xml
<?xml version="1.0"?>
<result>
  <recommend_service_list>

<recommend_service>
       <geocontext_id>3</geocontext_id>
       <service_name>Naver_Restaurant</service_name>
       <url>http://m.wingbus.com/l/?t=3406&o=p&t1=859</url>
       <weight>0.1</weight>
       <icon_image>89504E470D0A1A0A0000 · · · </icon_image>
    </recommend_service>

<recommend_service>
       <geocontext_id>4</geocontext_id>
       <service_name>Naver_News_Home  </service_name>
       <url>http://m.news.naver.com/main/m/home.nhn </url>
       <weight>0.2</weight>
       <icon_image>89504E470D0A1A0A00000 · · · </icon_image>
    </recommend_service>

<recommend_service>
       <geocontext_id>5</geocontext_id>
       <service_name>Bus_Info</service_name>
       <url>http://mobile.bus.go.kr/npda/</url>
       <weight>0.9</weight>
       <icon_image>89504E470D0A1A0A0000  · · · </icon_image>
    </recommend_service>

</recommend_service_list>
</result>
```

FIG. 10

METHOD AND SYSTEM FOR PROVIDING SPATIAL-BASED CONTEXT-AWARE SERVICE

CROSS-REFERENCE(S) TO RELATED APPLICATIONS

The present invention claims priority of Korean Patent Application No. 10-2010-0113432, filed on Nov. 15, 2010, which is incorporated herein by reference.

FIELD OF THE INVENTION

The present invention relates to a technique for providing personalized context-aware service based on a current location and a status of a user's environment, and more particularly, to an apparatus for creating geocontext including spatial information, sensor data and context, and a system and method for providing spatial-based context-aware service to offer an appropriate recommended service according to a user's location by using sensor data and his contextual information.

BACKGROUND OF THE INVENTION

The mobile service carriers in the past have been exclusively supplying their contents. The policy has not allowed end-users to use various contents that are created their own private applications. In addition, limited capability of mobile terminals has been an obstacle to consume various contents on the web sites. But recently, mobile devices with high performance and display resolution by the virtue of technological progress are widely distributed over the world rapidly such as Apple's iPhone, Google's Android etc. and their application market also has been invigorated due to the growth of App Store.

While this continuous increase of the contents has some advantages in that user can choose what he wants to consume, it requires too much time and effort to find the right contents using a search engine or categories of contents. Therefore, a technique of providing user-centered customized content, which allows users to receive only desired contents through filtering process according to their situations, is required. A representative technique that may be able to meet those requirements is a context-aware technology.

In general, the context-aware technique refers to recommend a user to offer services appropriate to a current status of the user in consideration of a location, profile, preference of the user, service history served to the user, sensor data for recognizing a current condition of the user, and the like. This technique includes a sensor data aggregation process to collect sensor data, a context-handling process of abstracting the collected sensor data to generate context information, a context reasoning process of combining several context information to recognize user's situation, and finally a recommended service provisioning process to transfer an appropriate service based on the context reasoning result.

In General, context-aware service technology is required to acquire knowledge of a system development and integration covering several processes extending from context modeling to service provision as mentioned above, as well as expert or technical knowledge with respect to an application domain.

Thus, existing context-aware services have been developed to limited spaces or domains such as an exhibition hall, a conference hall, a laboratory, or the like. The used sensor devices and types of them are determined in advance. Thus, it is quite difficult to extend the services to different domains or reuse the services.

In order to easily apply the context-aware services to various domains as well as develop, maintain, and manage those services, there have been proposed various techniques employing methods such as middleware in the form of a dedicated service platform, ontology, rule-based reasoning engine, message interception, a model-based development toolkit, a source code level-development support system, and the like. A major target of these techniques is to separate context handling and business logic, which can determine user's situation and take a proper action or response, in designing and implementing a context-aware service. Also, it is important to maintain the accuracy and quality of a recommended service depending on a user situation in order to apply the context-aware service in commercial services. In addition, an aspect of system architecture for supporting multiple concurrent connections should also be considered. For example, in case of ontology, it has some advantages in high accuracy of reasoning compared with other techniques, but expert skills in the context modeling are required for constructing an initial knowledge database. Also, the response time of a service search is drastically lowered as the knowledge database increases, resulting in that the ontology cannot be the right solution for business usages. The source code-level development support system has merits in reuse and extension in various domains, but it is not easily to continuously maintain and manage a service at the level of a developer because source codes are required to be modified.

SUMMARY OF THE INVENTION

In view of the above, the present invention provides an apparatus for creating geocontext including spatial information, sensor data, and context, to provide a spatial-based context-aware service.

Further, the present invention provides a system and method for providing spatial-based context-aware service to create a geocontext by using scenario-based context-aware service modeling and generate a list of recommended services by using the geocontext.

In accordance with a first aspect of the present invention, there is an apparatus for creating a geocontext for a context-aware service, the apparatus including:

a spatial region setting unit configured to set information regarding a space, in which the context-aware service is provided;

a diagram editor configured to provide interfaces defining input/out adapters needed to the geocontext for a context-aware service; and a geocontext creation unit configured to create the geocontext including sensor data from sensors and a context catalog server, one or more contexts, spatial information set by the spatial region setting unit and input/output adapter.

In accordance with a second aspect of the present invention, there is an apparatus for offering spatial-based context-aware service, the apparatus including:

a database configured to store a geocontext including spatial information, one or more contexts, and sensor data;

a sensor/context catalog server configured to manage meta data of the contexts and the sensor data;

a context processing server configured to generate a list of contexts based on the sensor data and the meta data upon a receipt of the sensor data from the mobile device;

a geocontext search server configured to search the database for candidate geocontexts appropriate for the user of the mobile device by using the location information of the mobile device and the list of contexts; and a context-aware management server configured to generate a list of recommended services by executing the searched candidate geocontexts.

In accordance with a third aspect of the present invention, there is a method for providing spatial-based context-aware service, the method including:

generating a list of contexts appropriate for a user by using meta data regarding sensors and contexts in accordance with a list of the sensors;

generating a list of candidate geocontexts based on a current location of the user;

executing the respective candidate geocontexts to generate a list of recommended services; and providing the list of recommended services to the user.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

The advantages and features of the present invention will be clearly understood from the following embodiments taken in conjunction with the accompanying drawings. In the drawings, like or similar reference numerals denote like or similar elements throughout the specification.

Hereinafter, embodiments of the present invention will be described in detail with the accompanying drawings.

Figure 1:
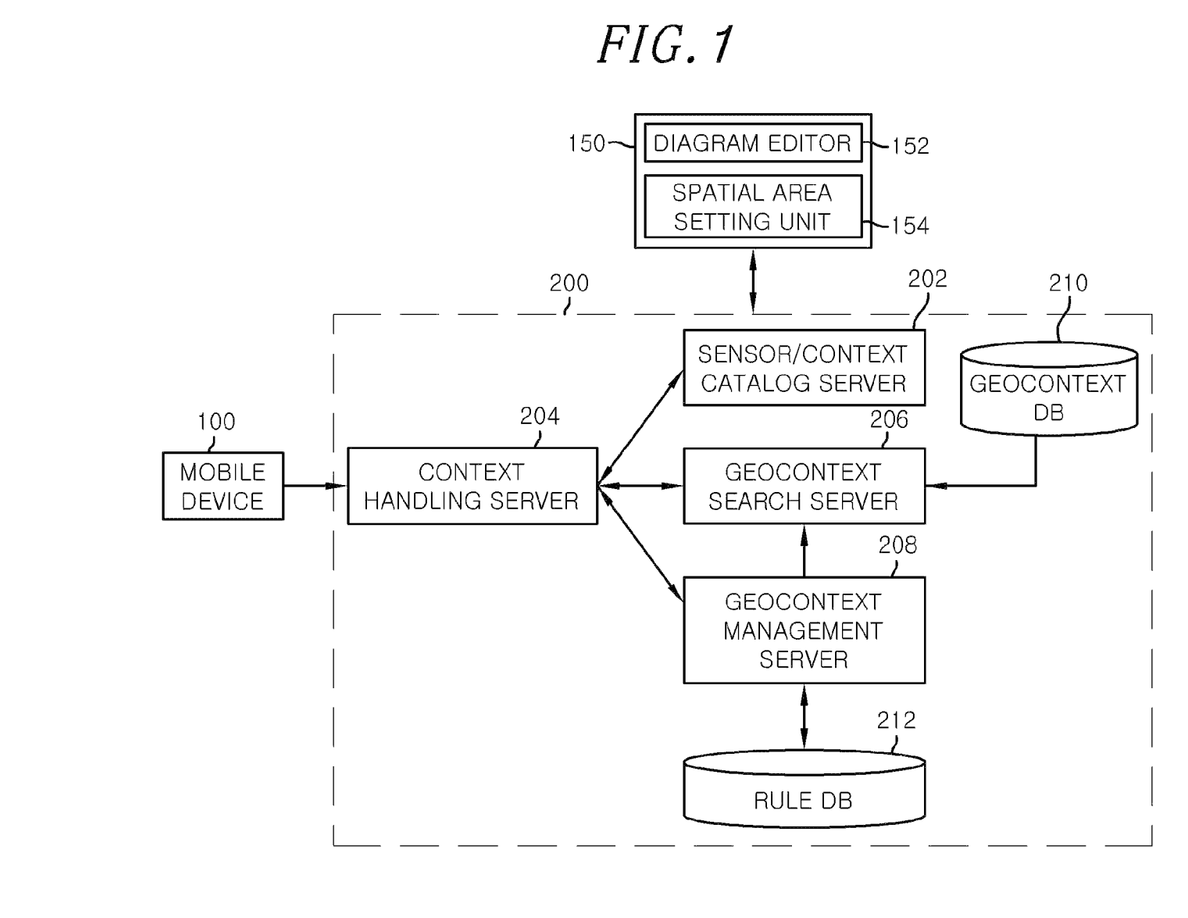
FIG. 1 is a block diagram of a system for providing a spatial-based context-aware service in accordance with an embodiment of the present invention.

FIG. 1 is a block diagram of a system for providing spatial-based context-aware service in accordance with an embodiment of the present invention. The system includes a geocontext authoring tool 150 for creating geocontext simultaneously produces a context-aware logic and spatial information, and a context-aware service apparatus 200 for offering context-aware service to a user or mobile device 100 in real time.

In an embodiment of the present invention, the term 'geocontext' includes information regarding context and space and refers to applications or software modules capable of providing a context-aware service. Also, geocontext includes model information in the form of an interpreter which can be dynamically executed in real time on middleware. For example, the geocontext may include open service gateway initiative (OSGi) bundles.

The term 'user' refers to an individual user or a mobile device, which is held by the user, to desire to receive a context-aware service through a network.

The geocontext authoring tool 150 generates a context-aware service model by performing a modeling process to finally create geocontext in the form of source codes, and packages the same.

FIGS. 2A to 2D illustrate exemplary examples of geocontext used in the present invention.

Figure 2A:
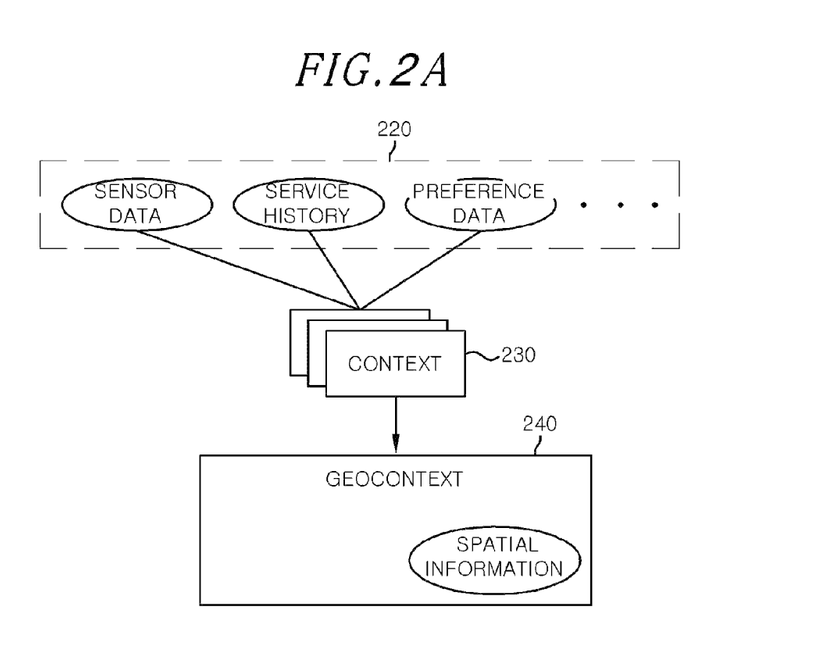
FIGS. 2A to 2D illustrate exemplary examples of geocontext used in the present invention.

FIG. 2A illustrates a relationship among context data 220, a context 230, and a geocontext 240 used in the context-aware service apparatus 200.

The context data 220 includes sensor data collected from sensors around the mobile device 100, previously collected sensor data, history data related to context-aware services executed by the mobile device 100, user preference based on user profile, and the like. The sensor data, for example, refers to data mainly collected from the user and sensors installed in a surrounding environment around the mobile device 100, and may also include data obtained by sensing a physical condition such as pulsation, body temperature, and the like detected through various sensors within the mobile device held by the user.

Figure 2B:
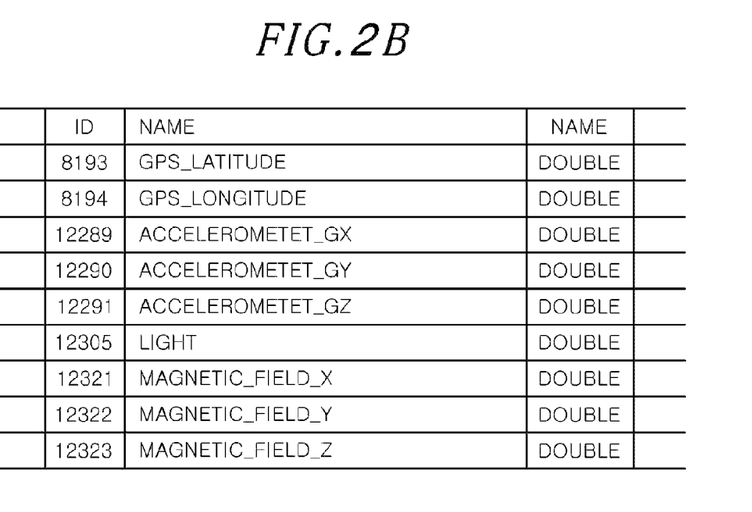

The context data 220, which has a minimum value of a data level required for the context-aware, is comprised of a sensor ID and value in the form of a key/value, and its major property may include an identifier (ID) of a sensor, a name of sensor data, and a type or name of sensor data as shown in FIG. 2B.

Figure 2C:
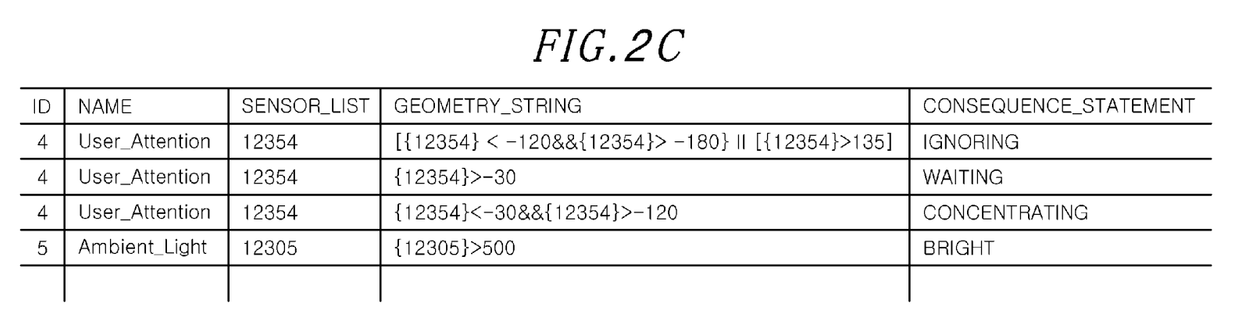

The context 230 refers to a primitive context, and is comprised of a key/value similar to the context date 220. Also, the context 230 has a combination of one or more context data 220, and, as shown in FIG. 2C, its major property may include identifier 'ID' of a context, a name 'NAME' of a context, a list of sensors 'SENSOR_LIST' constituting a context, a condition statement 'CONDITION_STATEMENT' expressing a logic for comparison/arithmetic operation by combining sensor data, and consequence statement 'CONSEQUENCE_STATEMENT' for finally setting a context value.

The geocontext 240 includes spatial information defining a space area to which multiple contexts 230 and the geocontext are to be applied. Since the geocontext 240 includes the multiple contexts 230, it has information regarding a complex context.

Figure 2D:
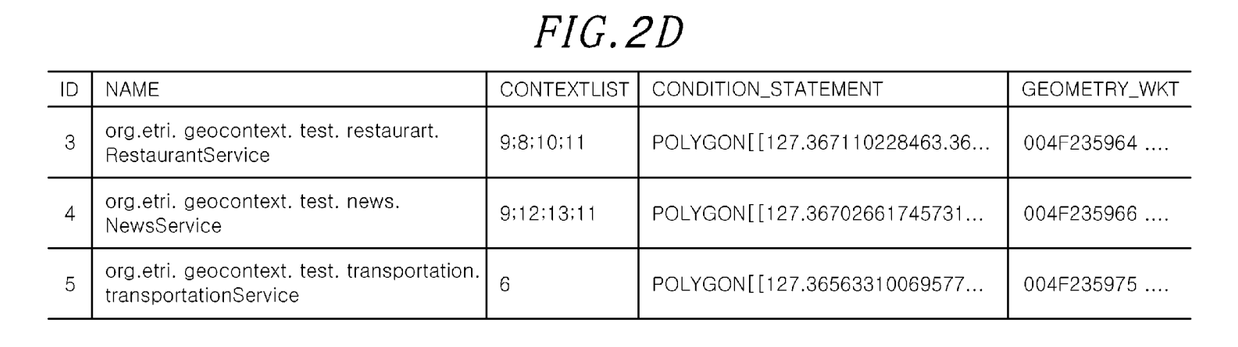

As shown in FIG. 2D, a major property of the geocontext 240 includes an identifier 'ID' of the geocontext, a name 'NAME' of the geocontext, a list of contexts 'CONTEXTLIST' constituting the geocontext, spatial information which can be defined as text and binary format of WKT (Well Known Text) like 'GEOMETRY_STRING' and 'GEOMETRY_WKT'. Here, the spatial information refers to a region of a spatially limited coverage in which a context-aware service may be provided. For example, when context-aware services differ in each borough/village in a town, the spatial information refers to a spatial region such as each borough/ village. The spatial information may be defined in various forms such as point, line, polygon, multipolygon, TIN, PolyHedra, or the like.

Referring back to FIG. 1, the geocontext authoring tool 150 includes a diagram editor 152. The diagram editor 152 serves to model the geocontext in a context-aware logic. More specifically, the diagram editor 152 models the geocontext in a work flow in order to generate a recommended service according to a current location of a user and status of the user's environment.

Figure 3:
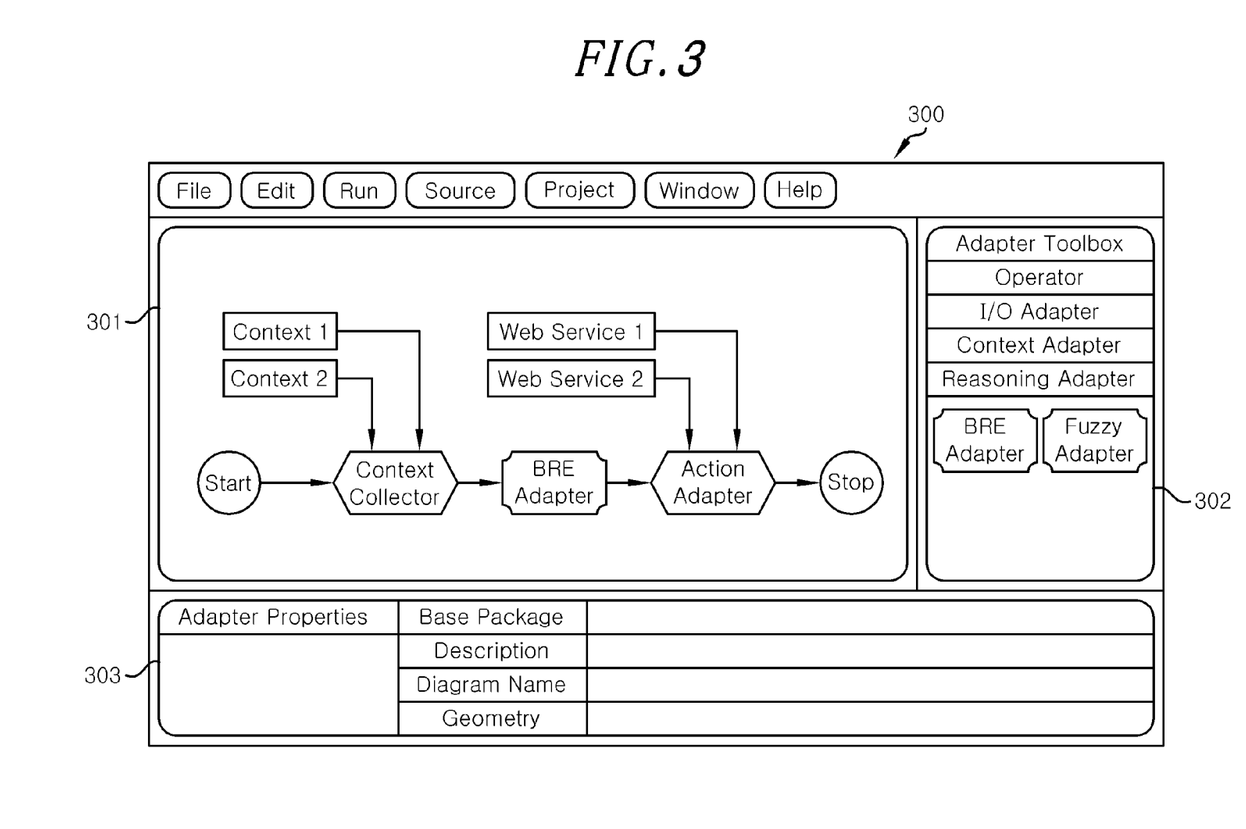
FIG. 3 is an example of modeling a context-aware logic in the geocontext authoring tool shown in FIG. 1.

For example, as shown in FIG. 3, the diagram editor 152 may model the geocontext in the form of a work flow. This model provides an interface including a palette 301 for generating a work flow expressing the context-aware service in a scenario flow, a tool box 302 for selecting various adapters constituting a diagram, and a property editor 303 for defining the property of each adapter.

The tool box 302 may include an operation tool group, an I/O (input/output) tool group, a context-aware tool group, a reasoning tool group, and the like.

The operation tool group may include an adapter for scaling a simple numerical value or performing a mathematical operation thereof, an adapter for a complex context obtained by further abstracting context information, an adapter for joining/controlling/branching/filtering a data flow between adapters within a work flow, and the like.

The input/output tool group may include a constant adapter for allowing a user to arbitrarily define a certain value, and a web service adapter for using various web service logics existing in an external file such as a comma separated value (CSV) or a database or on the Internet in input/output form in order to retrieve data from a mobile device or a server or send data.

The context-aware tool group may include a context model, a context model set, a context-aware service model, a recommended service mapping adapter, or the like, required for modeling a context-aware service.

The reasoning tool group may include an adapter for performing a context-aware logic for generating an appropriate service based on a context, by fuzzy, a rule, an ontology adapter, and the like.

The geocontext authoring tool 150 further includes a spatial region setting unit 154 which is capable of providing an interface for setting spatial information within the geocontext.

Figure 4:
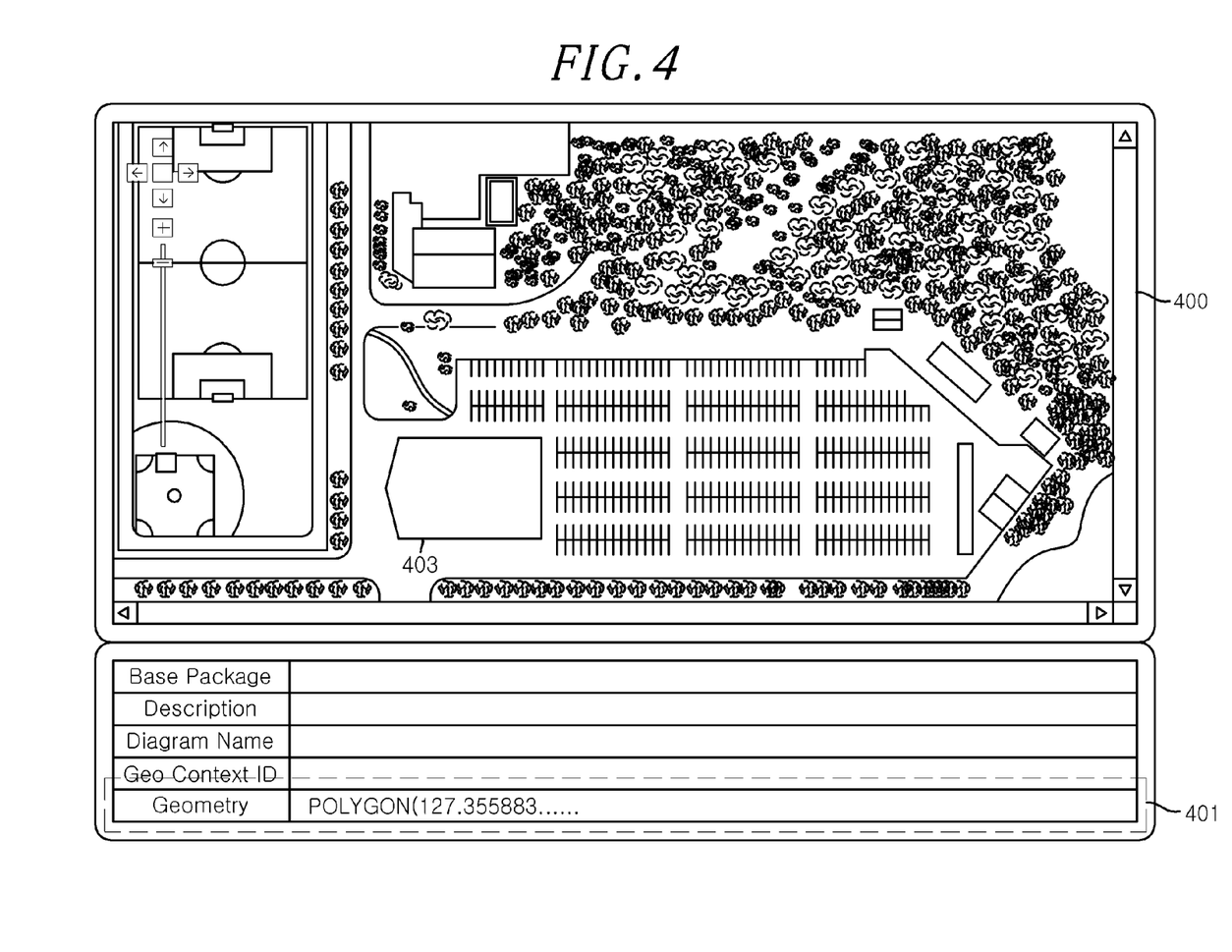
FIG. 4 shows an example of setting spatial information of the geocontext by the geocontext authoring tool shown in FIG. 1.

FIG. 4 shows an example of setting spatial information of the geocontext in the geocontext authoring tool 150 shown in FIG. 1. In FIG. 4, a map provided by an open API (Application Program Interface), e.g., a Google map or Naver map, or an image map provided by a user, is laid on a background through mash-up and geometry information in which the geocontext created in FIG. 3 can be executed is set up.

As shown in FIG. 4, a display window 400 displays a situation in which the image map of the open API or the image map of the user is put on the background through mash-up. When a space area in which a context-aware service is provided is established by polygon 403 or multi-polygon in the image map displayed on the display window 400, information regarding the space area can be reflected through a property interface 401. Thus, one geocontext is finally generated.

In the example of FIG. 4, the spatial information is set by polygon or multi-polygon by using the two-dimensional map, but it may also be possible to define a three-dimensional space model by TIN, PolyHedra, or the like by using a three-dimensional space map for providing a different service depending on an indoor space of a two or more-story building.

Figure 5:
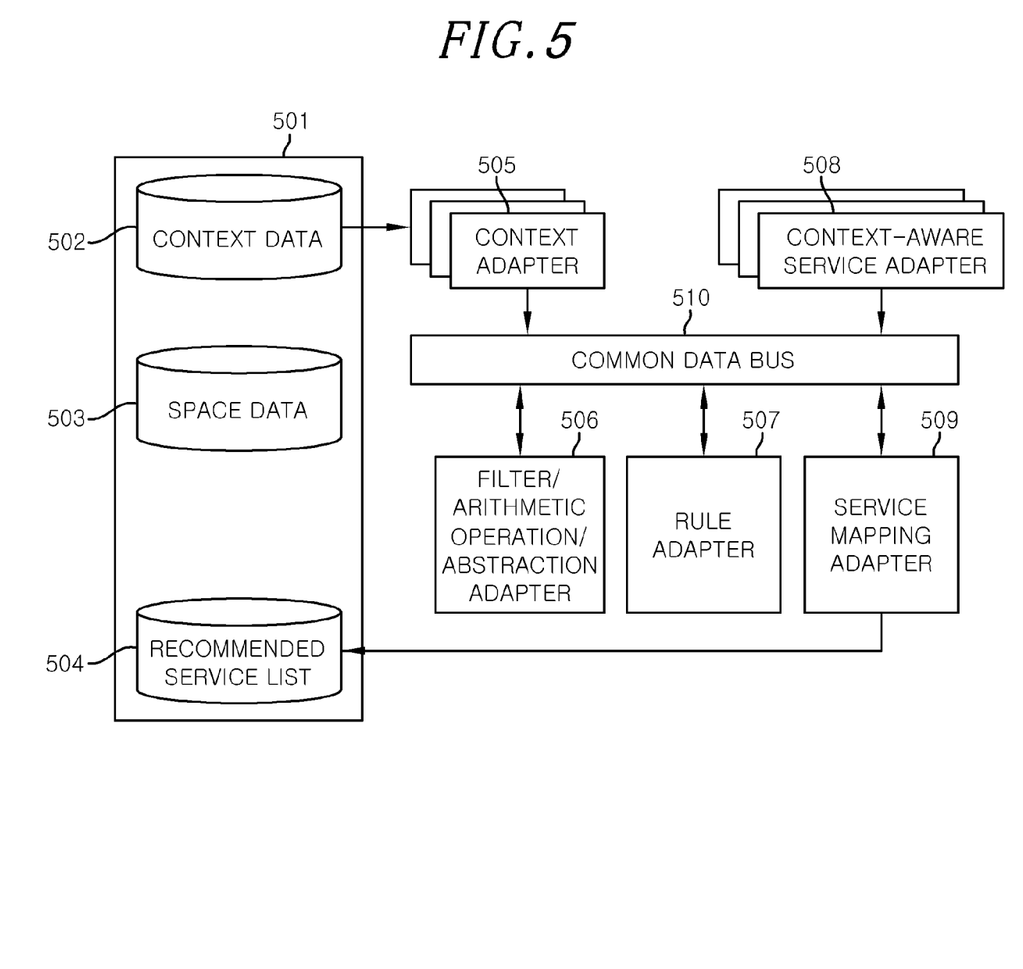
FIG. 5 illustrates a block diagram of the geocontext soft module produced by the authoring tools of FIGS. 3 and 4.

FIG. 5 illustrates a block diagram of the geocontext soft module produced by the authoring tools of FIGS. 3 and 4. As shown in FIG. 5, the geocontext 240 includes a data handler 501, a common data bus 510, and a plurality of input/output adapters 505 to 509. The data handler 501 implements an input/output interface for executing a geocontext. The data handler 501 includes context data 502 indicating a context value obtained by abstracting context data, geometry data 503 indicating a space area to which a geocontext is applicable, and a recommended service list 504 indicating the finally generated result, i.e., a list of recommended services, after executing the geocontext.

The common data bus 510 is used for exchanging input/output data between various adapters existing within the geocontext.

The input/output adapters, which implements a context-aware logic generated by the diagram editor 152 of the geocontext authoring tool 150, includes a context adapter 505, a filter/arithmetic operation/abstraction adapter 506, a rule adapter 507, a context-aware service adapter 508, and a service mapping adapter 509.

Context data generated by the context-aware service apparatus 200 for offering context-aware service of FIG. 1 is delivered by way of the data handler 501 to the context adapter 50. The filter/arithmetic operation/abstraction adapter 506 and the rule adapter 507 searches for a service appropriate for the user and set a weight value thereto in order to express a complex context included in the context.

The service with the weight is mapped to a service defined in the context-aware service adapter 508 through the service mapping adapter 509, thereby generating the recommended service list 504.

The context-aware service adapter 508 includes supplementary information for executing the context-aware service as well as a service identifier, name, icon so that the user can identify and use the context-aware service. Here, the supplementary information may be a web URL, and may include various types of information such as a control command for controlling a mobile device for user, a particular command or a binary code which may be executed in the mobile device.

Referring back to FIG. 1, the context-aware service apparatus 200 includes a context handling server 204, a sensor/context catalog server 202, a geocontext search server 206, a geocontext management server 208, a feocontext DB 210 and a rule DB 212.

The sensor/context catalog server 202 stores, registers and manages meta data of sensor data and contexts used in the context-aware service apparatus 200. The sensor data, for example, refers to data mainly collected from the user and sensors installed in a surrounding environment around the mobile device 100, and may also include data obtained by sensing a physical condition such as pulsation, body temperature, and the like detected through various sensors within the mobile device held by the user.

The context handing server 204, which is directly connected with the mobile device 100, receives sensor data collected by the mobile device 100 and generates a list of appropriate recommended services according to a user's location based on the collected sensor data and the user's contextual information. More specifically, the context handling server 204 abstracts the sensor data to generate a context of single primitive context, searches for geocontexts appropriate for the user's location, and executes the searched geocontexts to finally generate a list of recommended services with ranked priority in order.

A method for generating context from the collected sensor data will be described with reference to FIGS. 6A and 6B.

Figure 6A:
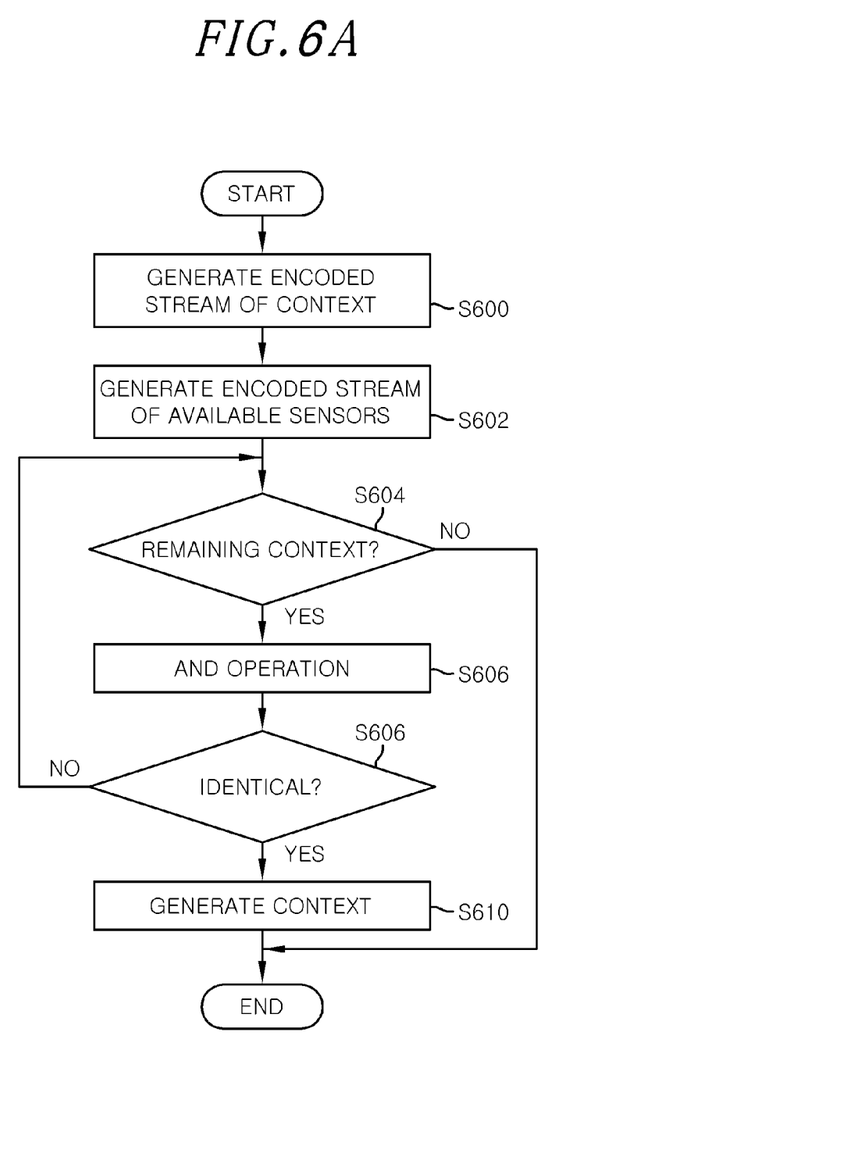
FIGS. 6A and 6B are flow charts illustrating a process of generating context by using a list of sensors collected from a mobile device.
Figure 6B:
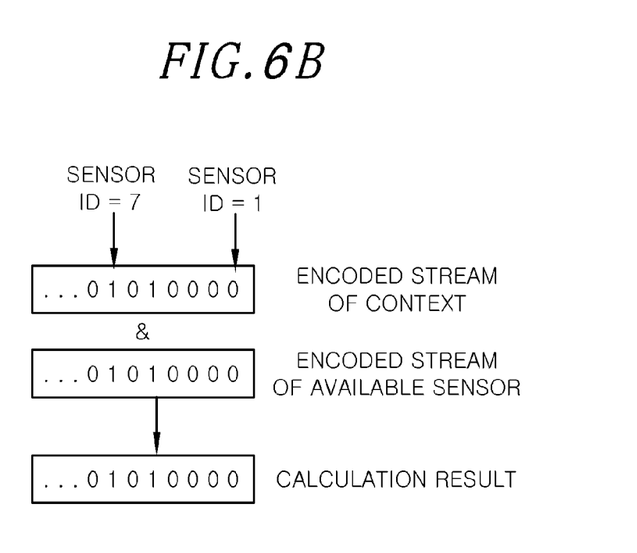

FIG. 6A is a flowchart illustrating a process of generating context by using a list of sensors collected from a user by the context handling server 204.

As shown in FIG. 6A, first, in step 600, the context handling server 204 reads context information stored in the sensor/context catalog server 202 and encodes the list of sensors, i.e., IDs of sensors, required for configuring a context into a single bit stream. In other words, a bit stream with a certain size is allocated to a context and a bit digit of each sensor ID required for generating the context is then indicted as 1, by which the context can be encoded in the form of a bit stream. For example, when maximum IDs of the sensors registered in the sensor/context catalog server 202 is 5000, in order to represent 5000 sensors as a bit stream, 625 bytes (=5000/8-bit) are required. Then, the 625-byte bit stream is allocated to a single context. For example, when sensor IDs required for generating the context are 1 and 7, the values of digits of bit 0 and bit 6 are set to be "1", thus encoding the context into the form of a bit stream.

The encoded stream with respect to the context is generated only once when the context-aware service apparatus 200 is driven.

Next, in step S602, the context handling server 204 generates an encoded stream of available sensors from a list of sensor IDs collected from the mobile device 100 in the same manner as that of generating the encoded stream for the context.

And then, in step S604, the context handling server 204 determines whether or not there still exists any encoded streams for a context.

If it is determined that the encoded stream for a context does not exist anymore, namely, if there is no context to be compared any further, the process is ended. However, if there are any encoded streams for a context, the process proceeds to step S606 in which the context handling server 204 performs "AND" operation on the encoded stream for a context and the encoded stream for a sensor. In this connection, the process of "AND" operating the available sensor encoding stream and the context encoding stream is shown in FIG. 6B. Thereafter, in step S608, the context handling server 204 determines whether or not the operation results are identical to the encoded stream for a context. Here, whether they are identical means that a context can be generated by using the sensor data of the mobile device.

When the operation results are not identical to the encoded stream for a context as a result of the determination in step S608, the process is returned to step S604. However, when the operation results are identical to the encoded stream for a context, the context handling server 204 generates the context by using the sensor data collected from the mobile device 100 in step S610. Namely, the context handling server 204 may perform a comparison operation on an encoded stream for a next context.

In step S610 of generating a context, a condition statement and a consequence statement among the major property information of the context may be applied to the value of the sensor data collected from the mobile device 100 to generate a new context.

As described above, the context handling server 204 encodes the sensor data and the contexts into a bit stream and handles the same, thus performing the processing at a high speed. In other words, in order to generate a single context, a context selected from the context list must be compared with the sensors in the list. Thus, when there are N number of sensor IDs and M number of context IDs, N*M number of comparison operations are required in order to compare them, and if the sensor IDs and the context IDs are increased, the amount of operations will increase geometrically. In the present invention, in order to reduce such comparison operations, the sensor IDs and context IDs are encoded into a bit stream so as to achieve a high speed operation.

Figure 7:
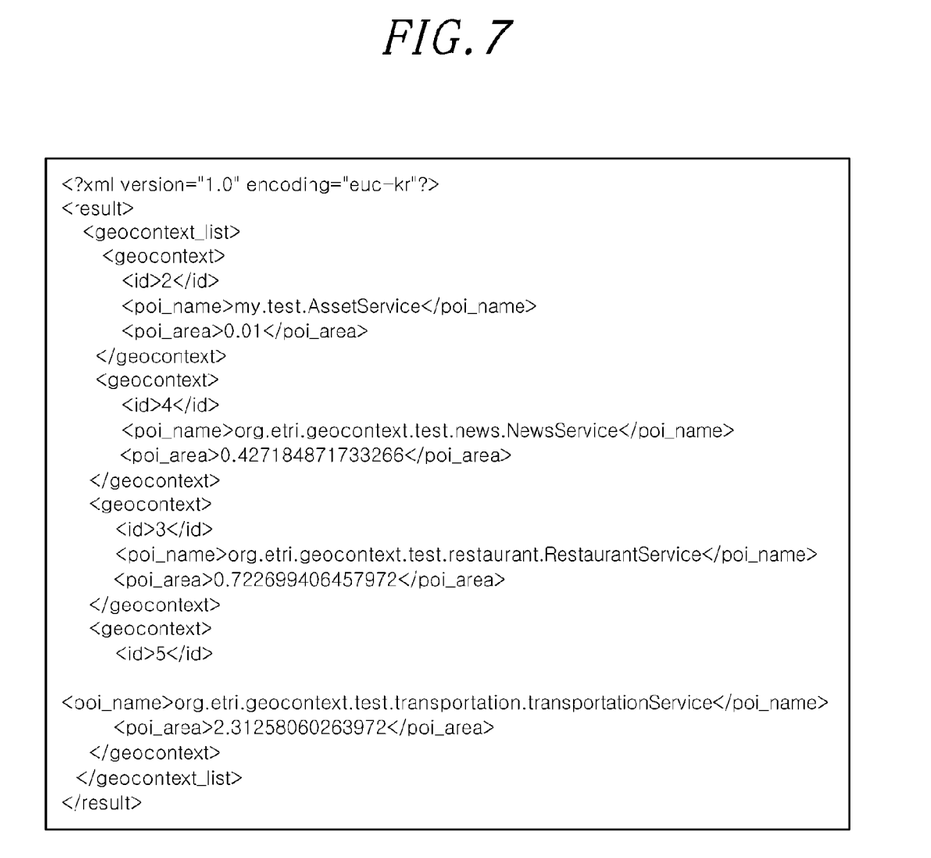
FIG. 7 is a view showing a list of candidate geocontexts created in accordance with an embodiment of the present invention.

After the geocontext search server 206 receives location information of the user, it searches for a geocontext geocontext database 210 for a list of applicable candidate geocontexts. As shown in FIG. 7, the geocontext list includes a plurality of candidate geocontexts, and each geocontext contains information regarding a point of interest (POI) with respect to the user location such as an ID, a POI name of an area to which the geocontext is applied, an area of the space of the POI, and the like.

The geocontext management server 208 dynamically executes, maintains and manages the geocontexts stored in the geocontext database 210, in a certain framework, e.g., an OSGi (Open Service Gateway initiative) framework. The geocontext management server 208 also executes the geocontext based on the rules stored in the rule database 212 to generate a list of recommended services, and provides the list of recommended services to the mobile device 100 through the geocontext handling server 204.

In other words, the geocontext management server 208 receives the context and the list of candidate geocontexts from the geocontext search server 206, and provides a list of recommended services corresponding to the received context and the list of candidate geocontexts, e.g., a list of recommended services in the form of a web service, to the mobile device 100 through the context handling server 204. Here, the respective recommended services within the list include property information required for executing the recommended services such as an identifier of the geocontext which has created a recommended service, a name of a recommended service, a URL for calling a recommended service, a service weight value, an icon image, and the like.

Figure 8:
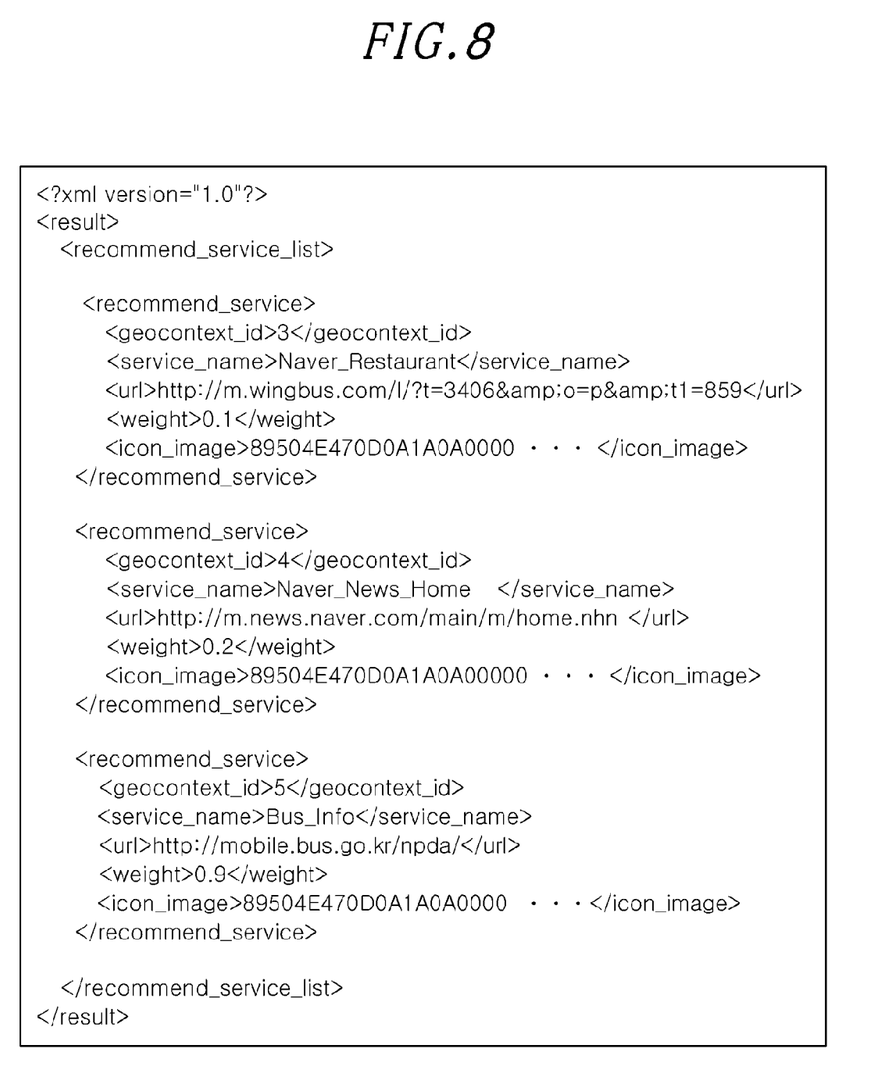
FIG. 8 is an illustration showing a web resource utilized for a spatial-based context-aware service in accordance with an embodiment of the present invention.

Further, as shown in FIG. 8, the geocontext management server 208 may transmit a binary code, an interpreter source code, or the like which can be actually executed in the mobile device of the mobile device 100 by utilizing a web resource for a context-aware service.

The rule database 212 stores knowledge rules for generating a recommended service appropriate for the user based on the sensor data collected from the mobile device 100, wherein the respective knowledge rules may be constructed by If-Then rule, fuzzy rule, ontology, or the like.

Figure 9:
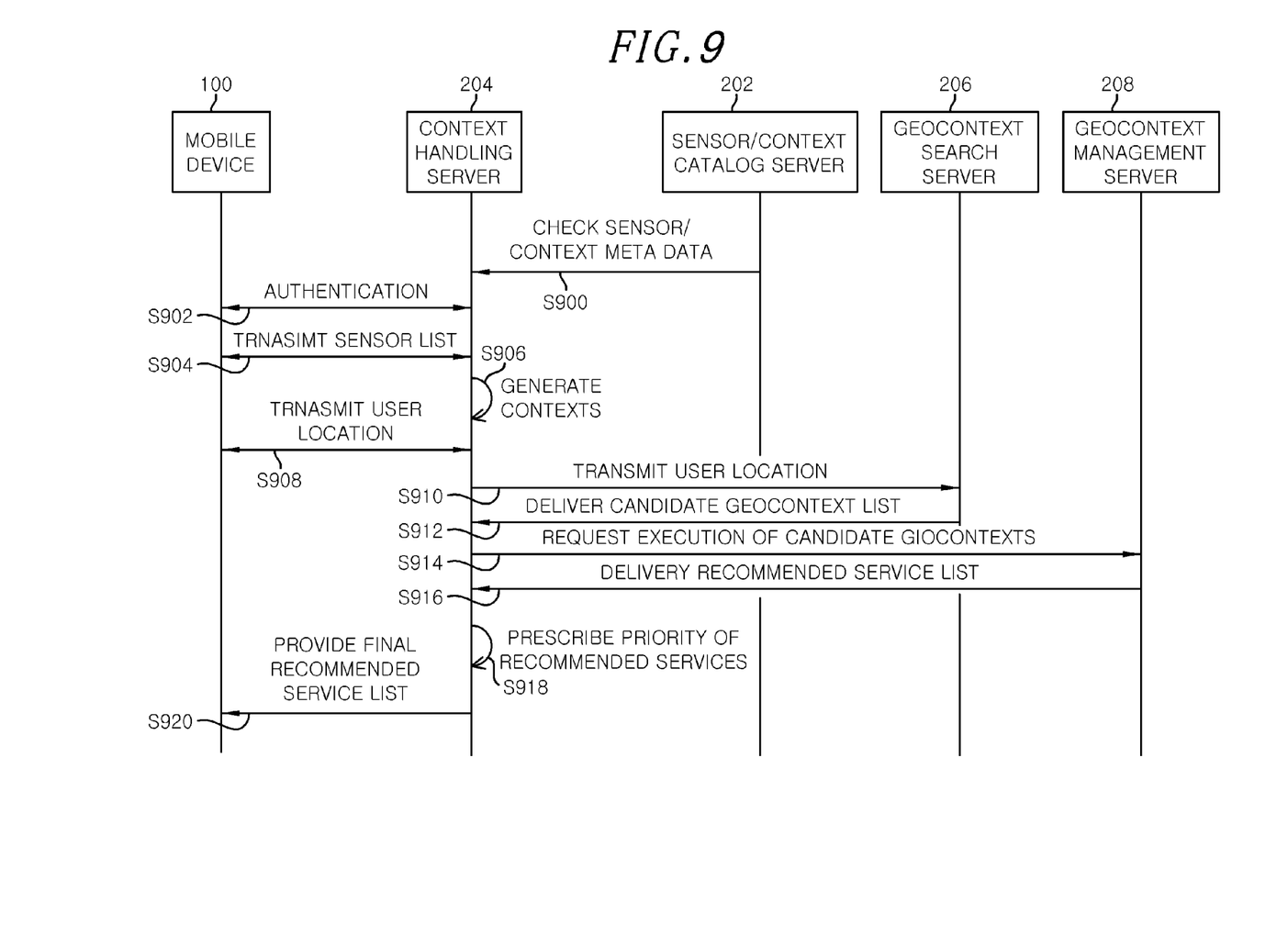
FIG. 9 is a flowchart illustrating a process of providing a list of recommended services to the user by the system for providing a spatial-based context-aware service in accordance with an embodiment of the present invention.

FIG. 9 is a flowchart illustrating a process of providing a list of recommended services to the user by the system for providing spatial-based context-aware service in accordance with an embodiment of the present invention.

In step S900, the context handling server 204 inquiries meta data regarding the sensors and context from the sensor/context catalog server 202, and loads the inquired meta data to initialize the context-aware service apparatus 200.

Thereafter, the context handling server 204 performs an authentication procedure with respect to the mobile device 100 who has accessed through a wired/wireless communication network in step S902 and receives a list of sensors from the mobile device 100 in step S904.

Next, in step S906, the context handling server 204 generates a list of contexts applicable to the mobile device 100 by using the list of sensors and the meta data for sensor and context.

Subsequently, the context handling server 204 receives location information from the user who is continuously moving in step S908, and transmits the received location information of the user to the geocontext search server 206 in step S910. Thereafter, in step S912, the geocontext search server 206 searches the geocontext database 210 for candidate geocontexts applicable to the location of the user and supplementary information thereof and transmits a list of searched candidate geocontexts and supplementary information to the context handling server 204.

The context handling server 204 transmits the list of the candidate geocontexts to the geocontext management server 208 to request execution of the geocontexts in step S914. And then, in step S916, the geocontext management server 208 executes the respective candidate geocontexts to generate a list of recommended services based on the executed candidate geocontexts. The generated list of recommended services is then provided to the context handling server 204.

Thereafter, the context handling server 204 prescribes a priority of each recommended service based on their spatial importance in step S918, and provides a final list of recommended services to the mobile device 100 based on the priorities in step S920. Here, the spatial importance may be variably applicable to a service policy of the user depending on areas and spaces, and in an embodiment of the present invention, a service provided limitedly to a narrow area is more important than a service applied to a generally wide area. Thus, the spatial importance may be applied to be in inverse proportion to a space area, to which the geocontext is applied, to thus reset the priorities of the services.

Figure 10:
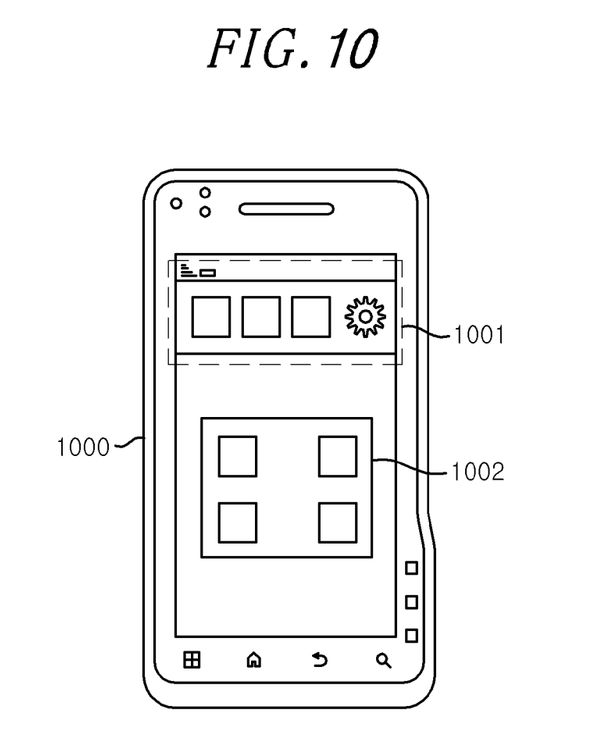
FIG. 10 illustrates an example of providing a recommended service generated based on a spatial-based context-aware service to a mobile device.

FIG. 10 illustrates an example providing a recommended service generated based on the spatial-based context-aware service to a mobile device. As illustrated in FIG. 10, the user drives a context-aware service application 1001 on a mobile device 1000 and accesses the context handling server 204 of FIG. 1. And then, sensor data of the mobile device 1000 such as GPS information and user's profile is delivered to the context handling server 204. Whenever the location of the mobile device 1000 is changed, the context handling server 204 transmits a list of recommended services 1002 based on the changed contextual information to the context-aware service application 1001. Thus, the user of the mobile device 1000 may selectively use his/her desired service among the list of the recommended services.

In accordance with the present invention, since an available context can be quickly searched through sensor data of the mobile device, hierarchical contexts can be easily and extendedly abstracted, and a context can be defined in a user desired form, rather than being limited to a particular domain, and a context-aware service to be applied can be created in the form of a scenario, whereby the spatial-based context-aware service can be easily developed, maintained, and managed.

In addition, since the adapters which can cooperatively operate various web resources are provided, web services targeting all of general people, such as existing shopping, advertisements, education, and the like, can be combined with the context-aware services so as to be easily changed into real time personalized target marketing services for a particular user group.

While the invention has been shown and described with respect to the particular embodiments, it will be understood by those skilled in the art that various changes and modification may be made without departing the scope of the present invention as defined in the following claims.

What is claimed is:

1. An apparatus for creating a geocontext for a context-aware service, the apparatus comprising:
a spatial region setting unit configured to set information regarding a space, in which the context-aware service is provided;
a diagram editor configured to provide interfaces defining input/output adapters needed to create the geocontext for a context-aware service; and
a geocontext creation unit configured to create the geocontext including sensor data from sensors and a context catalog server, one or more contexts, spatial information set by the spatial region setting unit and input/output adapter,
wherein the diagram editor includes:
a palette configured to generate a work flow expressing the context-aware service in the scenario flow;
a tool box configured to provide an interface for selecting a plurality of input and output adapters constituting the scenario flow; and
a property editor configured to define a property of each of the input and output adapters.

2. The apparatus of claim 1, wherein the spatial region setting unit is configured to provide an interface for setting the spatial information in a polygon or multi-polygon using a two-dimensional map or for setting three-dimensional spatial information for the context-aware service in TIN or PolyHedra using a three-dimensional spatial map.

3. An apparatus for creating a geocontext for a context-aware service, the apparatus comprising:
a spatial region setting unit configured to set information regarding a space, in which the context-aware service is provided;
a diagram editor configured to provide interfaces defining input/output adapters needed to create the geocontext for a context-aware service; and
a geocontext creation unit configured to create the geocontext including sensor data from sensors and a context catalog server, one or more contexts, spatial information set by the spatial region setting unit and input/output adapter,
wherein the geocontext created by the geocontext creation unit includes:
an input/output data handler configured to provide an interface for inputting and outputting the context data, spatial information and a list of recommended services;
a common data bus configured to exchange data with the input/output data handler between the adapters selected through the use of the diagram editor.

4. The apparatus of claim 3, wherein the adapters includes:
a context adapter configured to collect the context data;
a filter/arithmetic operation/abstraction adapter configured to express a complex context of the context-aware service;
a rule adapter configured to search for services appropriate for the user's current location and situation to set a weight to the searched services; and
a service mapping adapter configured to map the weighted services to the service defined by the context-aware service adapter to generate the list of recommended services.

5. The apparatus of claim 4, wherein the plurality of adapters further includes a context-aware service adapter configured to define the context-aware service for the user to identify and use the context-aware service,
wherein the context-aware service adapter includes supplementary information for executing the context-aware service, and
wherein the supplementary information includes a web address for executing the context-aware service, a control command for controlling a mobile device of the user pursuant to the context-aware service, and a command or binary code that can be executed in the mobile device.

6. An apparatus for offering spatial-based context-aware service, the apparatus comprising:
   a database configured to store a geocontext including spatial information, one or more contexts, and sensor data;
   a sensor/context catalog server configured to manage meta data of the contexts and the sensor data;
   a context processing server configured to generate a list of contexts applicable to the mobile device based on the sensor data and the meta data upon a receipt of the sensor data from the mobile device;
   a geocontext search server configured to search the database for candidate geocontexts appropriate for the user of the mobile device by using the location information of the mobile device and the list of contexts; and
   a context-aware management server configured to generate a list of recommended services by executing the searched candidate geocontexts,
   wherein the context-aware management server is configured to give a priority to each of the recommended services depending on the spatial importance based on the location information and spatial information, and to prescribe the priority of each of the recommended services in inverse proportion to the amount of the spatial information of the geocontext.

7. The apparatus of claim 6, wherein the context handling server is configured to encode the context information and sensor data in the form of bit stream, respectively, thereby generating the list of contexts by comparing the encoded bit streams.

8. The apparatus of claim 6, wherein each geocontext includes an identifier (ID) of the geocontext, a point of interest (POI) within the spatial information to which the geocontext is applied, and an area of the space of the POI.

9. The apparatus of claim 6, wherein each of the recommended services includes property information necessary for executing the recommended service.

10. The apparatus of claim 9, wherein the property information is provided to the user in the form of a binary code or an interpreter source code.

11. A method for providing spatial-based context-aware service, the method comprising:
   generating a list of contexts appropriate for a user by using meta data regarding sensors and contexts in accordance with a list of the sensors;
   generating a list of candidate geocontexts based on a current location of the user;
   executing the respective candidate geocontexts to generate a list of recommended services; and
   providing the list of recommended services to the user,
   wherein said generating a list of contexts includes:
      encoding IDs of the contexts in the form of a single bit stream as an encoded stream of context;
      encoding IDs of the sensors in the form of a bit stream as an encoded stream of sensors;
      comparing the encoded stream of context and the encoded stream of sensors to determine whether the encoded streams are identical to each other; and
      when it is determined that the encoded streams are identical to each other, generating the list of contexts by using the sensor list.

12. The method of claim 11, wherein said generating a list of contexts includes applying the property of the contexts to the respective sensors in the list, and
   wherein the property information includes a condition statement and a consequence statement.

13. The method of claim 11, wherein the respective recommended services are given a priority depending on the spatial importance based on the location information and spatial information.

14. The method of claim 13, wherein the priority is set in inverse proportional to the amount of the spatial information of the geocontext by which the recommended services has generated.

15. The method of claim 13, wherein the respective recommended services includes property information required for executing the recommended services.

* * * * *